US008798246B1

(12) United States Patent
Viswanathan

(10) Patent No.: US 8,798,246 B1
(45) Date of Patent: Aug. 5, 2014

(54) ALLOCATING SERVICE REQUESTS TO SERVICE PROVIDERS ACCORDING TO DYNAMIC NETWORK SERVICE FULFILLMENT CYCLE

(71) Applicant: Cisco Technology, Inc., San Jose, CA (US)

(72) Inventor: Ramkumar Viswanathan, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/895,240

(22) Filed: May 15, 2013

(51) Int. Cl.
*H04M 15/00* (2006.01)
*G06Q 30/02* (2012.01)
*G06Q 40/00* (2012.01)

(52) U.S. Cl.
USPC ............... 379/114.02; 705/14.55; 705/14.71; 705/26.4; 705/26.41

(58) Field of Classification Search
CPC . H04M 15/00; H04M 15/51; H04M 15/8044; H04M 2215/42; H04M 2215/54; H04M 2215/745; H04M 15/46; H04M 15/49; H04M 2215/46; H04M 2215/52; H04M 2215/56; H04M 15/805; H04M 2215/7457; H04M 15/8083; H04M 2215/016; H04M 2215/0184; H04M 2215/7475; G06Q 30/08; G06Q 30/0283; G06Q 30/0601; G06Q 40/09
USPC .................. 379/111, 112.07, 112.08, 112.09, 379/114.01, 114.02, 114.05, 114.09, 379/114.13, 121.01, 121.02; 705/7.12, 705/7.38, 14.1, 14.19, 14.24, 14.45, 14.55, 705/14.71, 26.25, 26.4, 26.41
See application file for complete search history.

(56) References Cited

U.S. PATENT DOCUMENTS

| 5,606,602 | A | * | 2/1997 | Johnson et al. | .......... | 379/114.02 |
| 5,917,897 | A | * | 6/1999 | Johnson et al. | .......... | 379/114.02 |
| 6,005,925 | A | * | 12/1999 | Johnson et al. | .......... | 379/115.02 |
| 6,005,926 | A | * | 12/1999 | Mashinsky | ............... | 379/114.02 |
| 6,144,727 | A | * | 11/2000 | Mashinsky | ............... | 379/114.02 |
| 6,205,211 | B1 | * | 3/2001 | Thomas et al. | .......... | 379/114.06 |
| 6,226,365 | B1 | * | 5/2001 | Mashinsky | ............... | 379/114.02 |
| 6,373,929 | B1 | * | 4/2002 | Johnson et al. | .......... | 379/114.02 |

(Continued)

OTHER PUBLICATIONS

"Cloud Computing Economics", [online], 2013, [retrieved on Mar. 11, 2013]. Retrieved from the Internet: <URL: http://cloud-computing-economics.com/saas-software-as-a-service/delivering-reliable-services-spot-instances/>, pp. 1-9.

(Continued)

*Primary Examiner* — Binh Tieu
(74) *Attorney, Agent, or Firm* — Leon R. Turkevich

(57) ABSTRACT

In one embodiment, a method comprises setting a first seed price for a network service item offered by a plurality of service providers in a computing network, and advertising a first seed price range for the network service item based on the first seed price; allocating service requests for the network service item among the service providers within a first dynamic network service fulfillment cycle, the allocating based on respective proposed costs advertised by the service providers relative to the first seed price range and further based on network-based performance capacity of the service providers in fulfilling the allocated service requests; and calculating a second seed price for a second dynamic network service fulfillment cycle contiguously following the first dynamic network service fulfillment cycle, based on the first seed price and the allocating within the first dynamic network service fulfillment cycle.

20 Claims, 4 Drawing Sheets

(56) References Cited

U.S. PATENT DOCUMENTS

| | | | |
|---|---|---|---|
| 6,421,434 B1* | 7/2002 | Rosu | 379/133 |
| 6,480,861 B1* | 11/2002 | Kanevsky et al. | 1/1 |
| 6,487,283 B2* | 11/2002 | Thomas et al. | 379/112.01 |
| 6,912,277 B1* | 6/2005 | Mashinsky et al. | 379/114.12 |
| 7,515,697 B2* | 4/2009 | Eng et al. | 379/115.01 |
| 2004/0111308 A1* | 6/2004 | Yakov | 705/8 |
| 2006/0167703 A1* | 7/2006 | Yakov | 705/1 |
| 2007/0073610 A1* | 3/2007 | Marugabandhu et al. | 705/37 |
| 2008/0228619 A1* | 9/2008 | Locker et al. | 705/37 |
| 2011/0022642 A1 | 1/2011 | deMilo et al. | |
| 2013/0018999 A1 | 1/2013 | Merrill et al. | |
| 2013/0196677 A1* | 8/2013 | Smith et al. | 455/452.1 |
| 2014/0052506 A1* | 2/2014 | Lee et al. | 705/14.1 |

OTHER PUBLICATIONS

Mazzucco et al., "Achieving Performance and Availability Guarantees with Spot Instances", [online], 2011, [retrieved on Mar. 11, 2013]. Retrieved from the Internet: <URL: http://math.ut.ee/~mazzucco/papers/hpcc_2011.pdf>, pp. 1-8.

Zhang et al., "Dynamic Resource Allocation for Spot Markets in Clouds", [online], 2011, [retrieved on Feb. 24, 2013]. Retrieved from the Internet: <URL:http://static.usenix.org/event/hotice11/tech/full_papers/Zhang.pdf>, pp. 1-6.

* cited by examiner

ALLOCATING SERVICE REQUESTS TO SERVICE PROVIDERS ACCORDING TO DYNAMIC NETWORK SERVICE FULFILLMENT CYCLE

TECHNICAL FIELD

The present disclosure generally relates to computer network-based auction systems for purchase and allocation of computer network-based products and/or services, for example cloud computing services.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Online Auction systems (i.e., network-based auction systems) have advanced from online merchants providing online auctions of goods (e.g., the online auction system "eBay" at the website address "www.ebay.com") to the online auctioning of network-based services, for example cloud computing services. Cloud-based application services (e.g., web server services, database services, etc.) are based on providing a user access to an instance of a virtualized application that is executed within a data center. Examples of such online auction systems include generalized second-price auction mechanisms. Google AdWords is an example of an online auction system utilizing generalized second-price auction mechanisms.

Vickrey-Clarke-Groves (VCG) is an example auction model in which bidders are not aware of each other's bids and the winner only pays the second highest bid

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
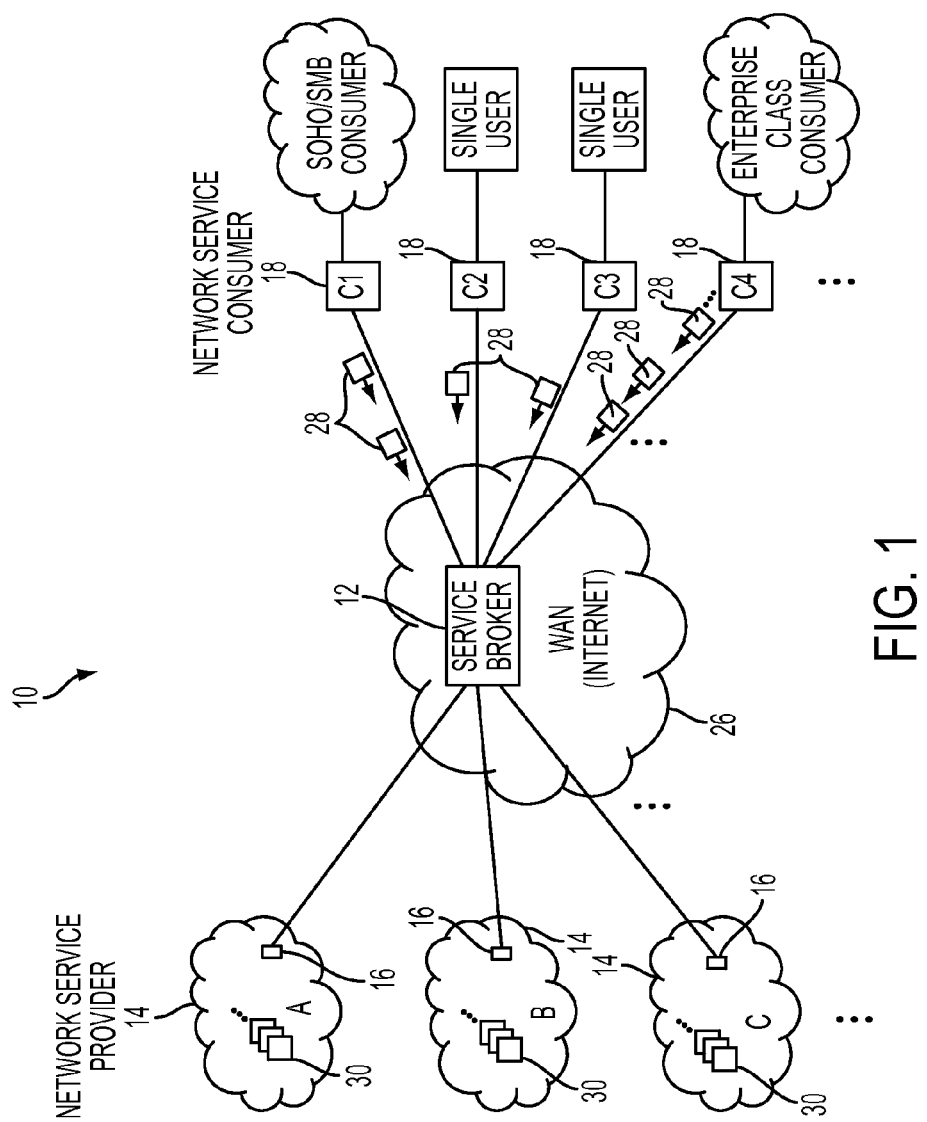
FIG. 1 illustrates an example system having an apparatus for allocating service requests according to a dynamic network service fulfillment cycle based on network-based performance capacity, according to an example embodiment.

In one embodiment, a method comprises setting a first seed price for a network service item offered by a plurality of service providers in a computing network, and advertising a first seed price range for the network service item based on the first seed price; allocating service requests for the network service item among the service providers within a first dynamic network service fulfillment cycle, the allocating based on respective proposed costs advertised by the service providers relative to the first seed price range and further based on network-based performance capacity of the service providers in fulfilling the allocated service requests; and calculating a second seed price for a second dynamic network service fulfillment cycle contiguously following the first dynamic network service fulfillment cycle, based on the first seed price and the allocating within the first dynamic network service fulfillment cycle.

In another embodiment, logic is encoded in one or more non-transitory tangible media for execution by one or more machines. When executed the logic is operable for: setting a first seed price for a network service item offered by a plurality of service providers in a computing network, and advertising a first seed price range for the network service item based on the first seed price; allocating service requests for the network service item among the service providers within a first dynamic network service fulfillment cycle, the allocating based on respective proposed costs advertised by the service providers relative to the first seed price range and further based on network-based performance capacity of the service providers in fulfilling the allocated service requests; and calculating a second seed price for a second dynamic network service fulfillment cycle contiguously following the first dynamic network service fulfillment cycle, based on the first seed price and the allocating within the first dynamic network service fulfillment cycle.

In another embodiment, an apparatus comprises a network interface circuit and a processor circuit. The network interface circuit is configured for advertising a first seed price range for a network service item offered by a plurality of service providers in a computing network; the network interface circuit also is configured for receiving respective proposed costs advertised by the service providers. The processor circuit is configured for setting a first seed price for the network service item and generating the advertisement for the first seed price range relative to the first seed price. The processor circuit further is configured for allocating service requests for the network service item among the service providers within a first dynamic network service fulfillment cycle, the processor circuit allocating the service requests based on respective proposed costs advertised by the service providers relative to the first seed price range and further based on network-based performance capacity of the service providers in fulfilling the allocated service requests. The processor circuit further is configured for calculating a second seed price for a second dynamic network service fulfillment cycle contiguously following the first dynamic network service fulfillment cycle, based on the first seed price and the allocating within the first dynamic network service fulfillment cycle.

DETAILED DESCRIPTION

Particular embodiments enable efficient and effective allocation of network service requests, generated by network service consumers, for network service items offered by multiple service providers within a computing network. An example network service item can be a prescribed computing or storage operation in a distributed computing system, for example providing a prescribed cloud-based storage capacity for a prescribed subscription interval, providing a prescribed amount of distributed computing operations for a prescribed subscription interval, etc.; another example network service item can be receiving any cloud-based streaming media event at a prescribed quality for a prescribed time interval (e.g., a full-length high-definition movie streamed over a wide-area network such as the Internet), a one-hour computer-based teleconferencing meeting between a prescribed number of users, etc.

Service requests for the network service item can be allocated based on the respective proposed costs advertised by the service providers relative to the seed price range, and further based on the relative network performance capacity of the service providers in fulfilling the allocated service requests. For example, service providers that can provide the network service item at a lower relative cost can cause a price influence based on the number of service requests that can be allocated to the corresponding service provider, whereas service providers that offer the network service at a higher relative cost are not utilized unless or until the lower-cost service providers have reached a determined network-based performance capacity. The network-based performance capacity can be based on the fulfillment capacity of the corresponding service provider within the network, quality of service-based parameters (e.g., whether network-based communication delays encountered with the corresponding service provider are within an acceptable latency), or whether a consumer or other network entity receives any error message that prevents fulfillment of the service request.

Hence, the service requests can be allocated to the service providers in the form of "service fulfillment contracts" in a manner that minimizes transaction costs and maximize his service utilization across multiple service providers.

The particular embodiments also enable a deterministic price allocation among the multiple service providers, where a seed price range for the network service item can be determined based on recalculation of a new seed price following a dynamic network service fulfillment cycle. The "dynamic network service fulfillment cycle" can be based on allocation of a prescribed number of service requests, allocation of service requests within a prescribed time interval, or a combination thereof, for example allocating a prescribed number of service requests within a prescribed time interval.

Hence, the example embodiments enable allocation between multiple service requests (from one or more network service consumers) and multiple service providers providing the same network service item, where the dynamic network service fulfillment cycle provides a "sliding window" that enables continued and repeated optimization of price relative to capacity and network performance.

The example embodiments also reconcile problems associated with the inherent differences between open platform-based network technologies that permit open innovation and experimentation, and enterprise markets that are required to comply with security and regulatory constraints such as federal, state, and/or local laws and/or regulations imposed on the companies engaged in the enterprise markets. The allocation of a service request for a network service item to a service provider according to the example embodiments enables a dynamic allocation of a "service fulfillment contracts" to a participating provider within a "sliding-window" VCG auction mechanism that can simultaneously minimize transaction costs and maximize his service utilization across multiple providers.

FIG. 1 is a diagram illustrating an example network 10 having an apparatus 12 configured for operating as a service broker based on allocating service requests 28 for a network service item 30 among multiple network service providers 14, according to an example embodiment. The apparatus 12 is a physical machine (i.e., a hardware device) configured for implementing network communications with other physical machines 16, 18 via the network 10, including for example a wide area network (WAN) 26 enabling communications between the apparatus 12, network service providers 14, and network service consumers 18. Hence, the apparatus 12 is a network-enabled machine implementing network communications via the network 10.

Figure 2:
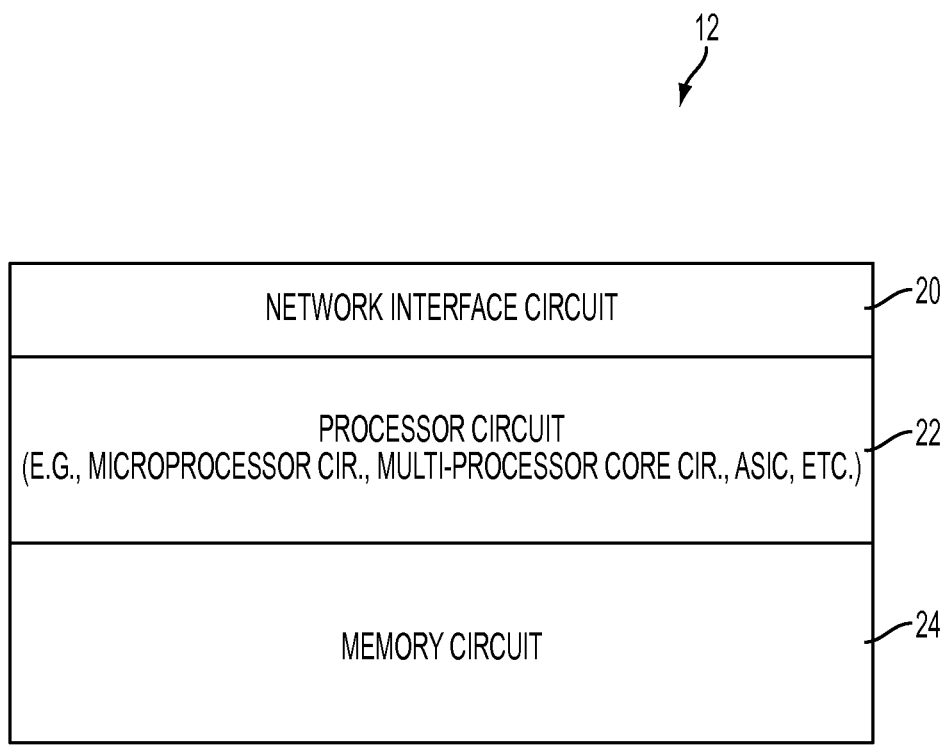
FIG. 2 illustrates an example apparatus for allocating service requests according to a dynamic network service fulfillment cycle based on network-based performance capacity, according to an example embodiment.

FIG. 2 illustrates the apparatus 12 of FIG. 1. The apparatus 12 can comprise one or more network interface circuits 20, one or more processor circuits 22, and one or more memory circuits 24. As described in further detail below, the network interface circuit 20 can be configured for advertising a seed price range for a network service item offered by the network service providers 14 in the computing network 10. The network interface circuit 20 also can be configured for receiving from each network service provider 14 a corresponding proposed cost for the network service item, such that the network interface circuit 20 receives the respective proposed costs advertised by the service providers.

As described in further detail below, the processor circuit 22 can be configured for operating as a service broker between the network service consumers 18 and the network service providers 14 based on advertising a first seed price range for the network service item 30, collecting the proposed costs for the network service item 30 from the respective network service providers 14, dynamically allocating the received service requests 28 among the service providers 14 within a dynamic network service fulfillment cycle, and recalculating a second seed price based on the first seed price and the allocation during the prior dynamic network service fulfillment cycle.

The processor circuit 22 also can be configured for allocating service requests 28 for the network service item 30 among the service providers 14 within a dynamic network service fulfillment cycle. In particular, the network interface circuit 20 can receive one or more service requests 28 from any one of the network service consumers (e.g., "C1", "C2", "C3", "C4" etc.) 18 of FIG. 1. Each network service consumer 18 is illustrated as a physical machine, for example as a policy gateway for a network service consumer such as an enterprise-level storage consumer (e.g., "C4"), a customer premises computer or router for a small business (SMB) or small office/home office (SOHO) computing network (e.g., "C1"), a single user (e.g., "C2" or "C3"), etc. The processor circuit 22 can collect the service requests 28 from the network service consumers 18 and allocate the service requests 28 during the next dynamic network service fulfillment cycle, described below, based on receiving proposed costs for the network service item 30 from the machines 16, implemented for example as policy-based transaction brokers on behalf of the respective network service providers 14.

As described below, the processor circuit 22 also can calculate a new seed price for each successive dynamic network service fulfillment cycle that contiguously follows a prior dynamic network service fulfillment cycle, based on the seed price used during the prior dynamic network service fulfillment cycle and the associated allocation of the service requests 28 for the network service item 30 among the service providers 14 within the prior dynamic network service fulfillment cycle.

The memory circuit 24 can be configured for storing any data associated with the network interface circuit 20 and/or the processor circuit 22, for example data packets to be sent or received by the apparatus 12 to any one of the machines 16 or 18 via a wide-area network (WAN) 26 such as the Internet, or any parameters used were calculated by the processor circuit 22, described below.

Any of the disclosed circuits of the apparatus 12 (including the network interface circuit 20, the processor circuit 22, the memory circuit 24, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 24) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 24 can be implemented, for example, using a nonvolatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 23 can be implemented dynamically by the processor circuit 22, for example based on memory address assignment and partitioning executed by the processor circuit 22.

Figure 3:
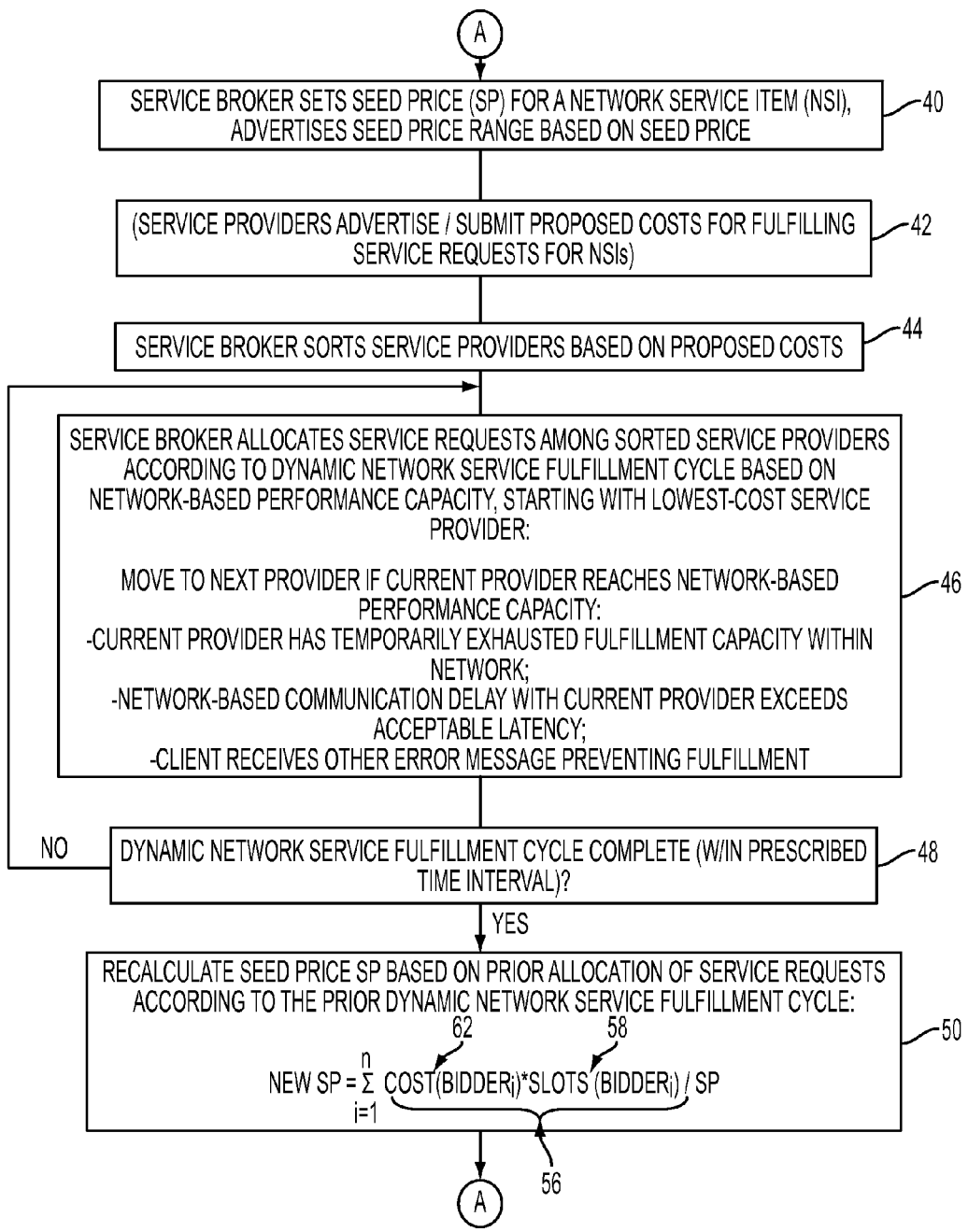
FIG. 3 illustrates an example method by the apparatus of FIG. 2 in allocating service requests according to a dynamic network service fulfillment cycle based on network-based performance capacity.

FIG. 3 illustrates an example method by the apparatus 12 in allocating service requests according to a dynamic network service fulfillment cycle based on network-based performance capacity, according to an example embodiment. The operations described with respect to any one of the FIGS. 1-4 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the FIGS. 1-4 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Figure 4:
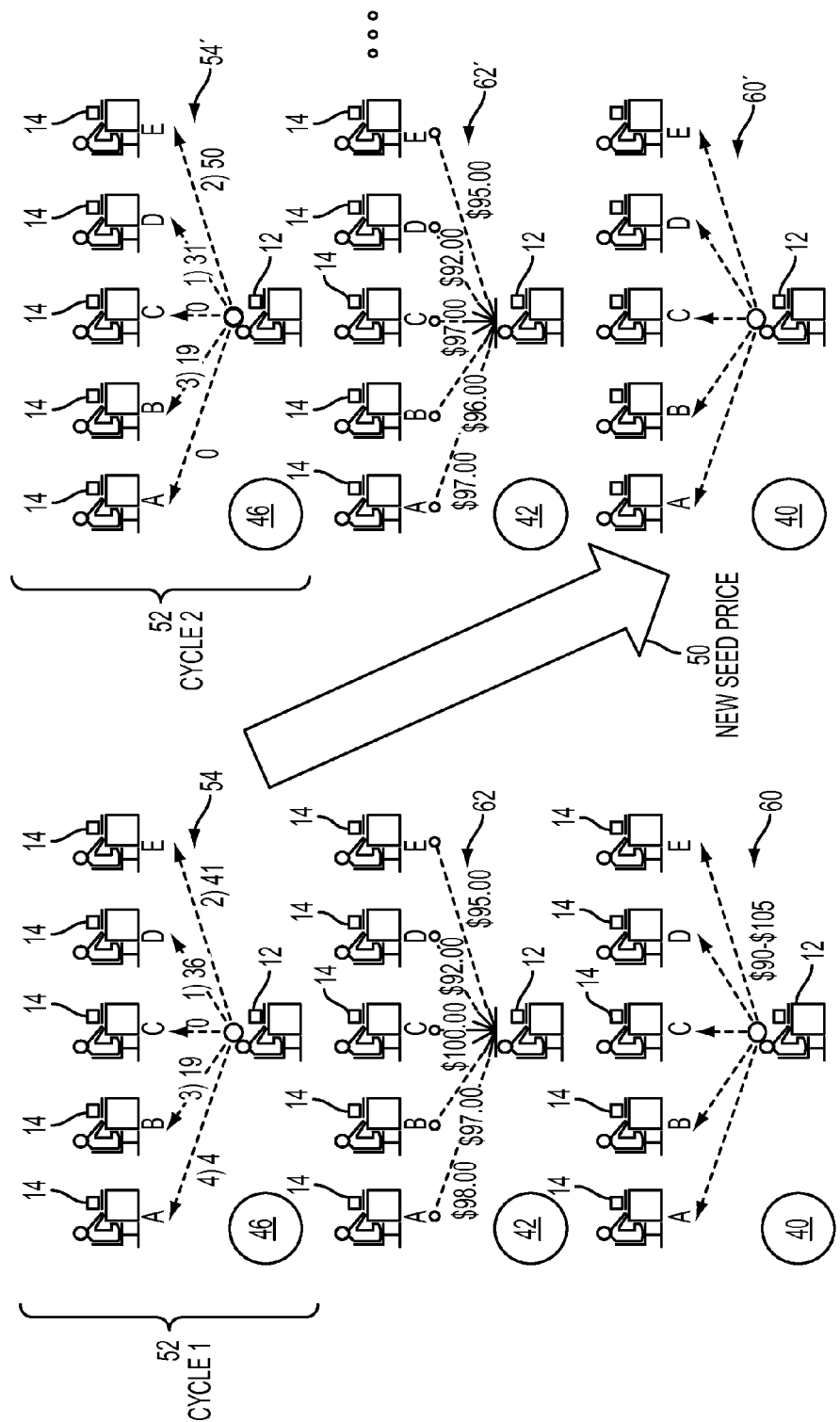
FIG. 4 illustrates successive dynamic network service fulfillment cycles, including recalculation of a seed price for the next successive dynamic network service fulfillment cycle, according to an example embodiment.

Referring to operation 40 of FIG. 3, the processor circuit 22 can be configured for generating a seed price for a network service item 30, and generating the advertisement for the seed price range relative to the seed price. The seed price range represents the price range that the service broker 12 (acting on behalf of the network service consumers 18) is willing to pay for the network service item 30: the initial seed price (and the associated initial seed price range) can be based on various parameters, including historical information, transaction costs, industry pricing information, etc. For example, the processor circuit 22 can set the seed price range 60 based on setting a seed price (SP) of one hundred U.S. dollars (SP=$100). As illustrated in FIG. 4, the network interface circuit 20 can output an advertisement for the first seed price range 60 for the network service item 30, illustrated as having a price range of ninety to one hundred five U.S. dollars (e.g., "Seed Price Range for NSI=$90 to $105").

Each of the network service providers 14 can advertise (i.e., submit) in operation 42 their respective proposed costs (i.e., bidding prices)) 62 for providing the specified network service item 30 in response to reception of the advertisement for the first seed price range 60. As illustrated in FIG. 4, each of the network service providers 14 can provide the following example proposed costs 62: "A=$98", "B=$97", "C=$100", "D=$92", and "E=$95". The network interface circuit 20 can receive the proposed costs 62 from the machines 16 of the respective network service providers 14 via the wide-area network 26.

In response to the network interface circuit 20 receiving the proposed costs 62, the processor circuit 22 can begin allocation of the service requests 28 based on sorting in operation 44 the service providers 14 according to the respective proposed costs 62, starting with the lowest proposed cost. Hence, the processor circuit 22 can generate a list of sorted service providers having the order of "D, E, B, A, C" based on the respective proposed costs of "D=$92", "E=$95", "B=$97", "A=$98", and "C=$100". The processor circuit in operation 46 can allocate the service requests 28 among the sorted service providers 14 according to a dynamic network fulfillment cycle ("Cycle 1" 52 of FIG. 4) based on network-based performance capacity, starting with the lowest-cost service provider "D". In one example, the dynamic network service fulfillment cycle 52 can be set as a fulfillment of a prescribed number of service requests (e.g., one hundred (100) service requests) 28, or fulfillment of the service requests 28 within a prescribed time interval (e.g., one hour); alternately, the dynamic network service fulfillment cycle 52 can be set as a fulfillment of a prescribed number of service requests within a prescribed time interval, for example one hundred (100) service requests 28 within one hour.

The processor circuit 22 can continue to allocate service requests 28 to the lowest-cost service provider "D" 14 of FIG. 4 until the currently-allocated service provider "D" reaches its corresponding network-based performance capacity with the currently-allocated service requests 28. For example, the processor circuit 22 can move from the currently-allocated service provider "D" to the next higher cost service provider "E" among the sorted service providers in response to any of the following events indicating the currently-allocated service provider "D" has reached its capacity: if the currently-allocated service provider has temporarily exhausted its fulfillment capacity within the network 10; if a network-based communication delay detected with respect to the network service provider 14 exceeds a prescribed acceptable latency (e.g., a requested media stream suffers unacceptable delays, cloud-based storage encounters unacceptable delays in data storage/retrieval/synchronization, or a compute service provides an acceptable delay in providing the required compute response, etc.); if the processor circuit 22 of the service broker 12 and/or any network service consumer 18 receives any other error message preventing fulfillment of the service requests 28 by the currently-allocated service provider 14. Other methods can be used by the apparatus 12 to determine whether the currently-allocated service provider has reached a network-based performance capacity.

The moving of the allocation to the next service provider among the sorted service providers is repeated in operation 48 until the first dynamic network service fulfillment cycle "Cycle 1" 52 is complete (e.g., allocation of one hundred service requests 28 within one hour). As illustrated in FIG. 4, the allocation of service requests 28 by the apparatus 12 in operations 44, 46 and 48 during the network service fulfillment cycle "Cycle 1" 52 results in the following allocation 54 of service requests 28 among the network service providers 14, in the following order: the network service provider "D" is first allocated a total of thirty-six (36) service requests 28 in response to being the lowest-cost service provider; the next lowest-cost network service provider "E" is allocated a total of forty-one (41) service requests 28 in response to the network service provider "D" reaching capacity; the next lowest-cost network service provider "B" is allocated a total of nineteen (19) service requests 28 in response to the network service provider "E" reaching capacity; the next lowest-cost network service provider "A" is allocated a total of four (4) service requests 28 in response to the network service provider "B" reaching capacity; and the highest-cost network service provider "C" receives zero (0) service requests 28.

The allocation 54 of service requests 28 among the network service providers 14 during the first dynamic network service fulfillment cycle "Cycle 1" is used by the processor circuit 22 in operation 50 to calculate a second seed price ("New SP") for the next "second" dynamic network service fulfillment cycle "Cycle 2" 52 contiguously following the first dynamic network service fulfillment cycle "Cycle 1" 52.

As illustrated in FIG. 3, the second seed price ("New SP") is calculated by the processor circuit 22 based on the determining a summation of a price influence 56 by each network service provider 14: the price influence 56 is based on a multiplication product of the proposed cost 62 by each network service provider 14 multiplied by a count (i.e., "slots") 58 of the service requests 28 allocated to the corresponding service provider. Hence, the price influence 56 for the network service provider "D" 14 is $92*36=$3312; the price influence 56 for the network service provider "E" 14 is $95*41=$3895; the price influence 56 for the network service provider "B" 14 is $97*19=$1843; the price influence 56 for the network service provider "A" 14 is $98*4=$392; and the price influence 56 for the network service provider "C" 14 is $100*0=0, where the symbol "*" represents a multiplication operation. The summation of the price influence ($3312+$3895+$1843+$392+0=$9442) is divided by the first seed price (SP=$100) to determine the second seed price (New SP=$94.42). Hence, the second seed price represents a more accurate representation of the true market price of the network service items 30.

The second seed price (New SP=$94.42) that was calculated in operation 50 can be used by the processor circuit 22 to advertise in operation 40 of FIG. 3 a second seed price range (e.g., $90 to $98) 60' for the network service item 30. Consequently, the processor circuit 22 can allocate a subsequent group of service requests 28 for the network service 30 among the network service providers 14 within a second dynamic network service fulfillment cycle "Cycle 52" based on the second respective proposed costs 62' advertised by the network service providers 14 relative to the second seed price range 60'. As described previously, the allocation 54' in operations 46 and 48 is based on starting with the lowest-cost service provider among the service providers (sorted according to their respective proposed costs 62'), and allocating the service requests 28 to the lowest-cost service provider (e.g., "D") until the corresponding network-based performance capacity of the lowest-cost service provider is reached, and then moving to the next network service provider 14.

According to example embodiments, the allocation of service requests within a first dynamic network service fulfillment cycle, and calculating a second seed price for a second dynamic network service fulfillment cycle, enables optimization of pricing for a network service item based on convergence of the seed price toward a true market value for the network service item. Each dynamic network service fulfillment cycle provides a continuously moving "price window" that enables discovery of a true market price for a network service item as the continuously adjusted price for each dynamic network service fulfillment cycle can convert to a true market price relative to the availability of service providers to provide the network service item relative to their network-based performance capacity.

The example embodiments also can optimize pricing for network service consumers based on enabling service requests to be allocated across multiple distinct service providers, where the higher cost service providers can be avoided until the lowest-cost service provider have been utilized to their capacity. The allocation of service requests based on network-based performance capacity also enables network service consumers to manage their own demand elasticity based on rotating the service requests to different service providers. The allocation based on network-based performance capacity also can be used to determine the value of acceptable performance for each service provider, and enables the creation of instantaneous service level agreement descriptors to further define network-based performance for the network service items.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
setting a first seed price for a network service item offered by a plurality of service providers in a computing network, and advertising a first seed price range for the network service item based on the first seed price;

allocating service requests for the network service item among the service providers within a first dynamic network service fulfillment cycle, the allocating based on respective proposed costs advertised by the service providers relative to the first seed price range and further based on network-based performance capacity of the service providers in fulfilling the allocated service requests; and calculating a second seed price for a second dynamic network service fulfillment cycle contiguously following the first dynamic network service fulfillment cycle, based on the first seed price and the allocating within the first dynamic network service fulfillment cycle.

2. The method of claim 1, further comprising:

advertising a second seed price range for the network service item based on the second seed price; and allocating a subsequent group of the service requests for the network service among the service providers within the second dynamic network service fulfillment cycle, based on second respective proposed costs advertised by the service providers relative to the second seed price range and further based on the network-based performance capacity of the service providers in fulfilling the allocated service requests during the second dynamic network service fulfillment cycle.

3. The method of claim 1, wherein the allocating includes:

sorting the service providers according to the respective proposed costs; and allocating the service requests among the sorted service providers, starting with a lowest-cost service provider among the sorted service providers, relative to the network-based performance capacity of the lowest-cost service provider.

4. The method of claim 3, wherein the allocating among the sorted service providers further includes:

moving allocation of unfulfilled service requests from a currently-allocated service provider to a next service provider among the sorted service providers, based on the currently-allocated service provider reaching the corresponding network-based performance capacity with currently-allocated service requests; and repeating moving allocation to the next service provider among the sorted service providers until the first dynamic network service fulfillment cycle is complete.

5. The method of claim 3, wherein the calculating of a second seed price includes:

determining a summation of a price influence by each service provider, the price influence by each service provider based on a product of the proposed cost by each service provider multiplied by a count of the service requests allocated to the corresponding service provider; and dividing the summation of the price influence by the first seed price to determine the second seed price.

6. The method of claim 1, wherein the first network service fulfillment cycle is based on a prescribed number of the service requests being allocated among the service providers.

7. The method of claim 1, wherein the first network service fulfillment cycle is based on a prescribed number of the service requests being allocated among the service providers within a prescribed time interval.

8. Logic encoded in one or more non-transitory tangible media for execution by one or more machines and when executed operable for:

setting a first seed price for a network service item offered by a plurality of service providers in a computing network, and advertising a first seed price range for the network service item based on the first seed price;

allocating service requests for the network service item among the service providers within a first dynamic network service fulfillment cycle, the allocating based on respective proposed costs advertised by the service providers relative to the first seed price range and further based on network-based performance capacity of the service providers in fulfilling the allocated service requests; and calculating a second seed price for a second dynamic network service fulfillment cycle contiguously following the first dynamic network service fulfillment cycle, based on the first seed price and the allocating within the first dynamic network service fulfillment cycle.

9. The logic of claim 8, further operable for:

advertising a second seed price range for the network service item based on the second seed price; and allocating a subsequent group of the service requests for the network service among the service providers within the second dynamic network service fulfillment cycle, based on second respective proposed costs advertised by the service providers relative to the second seed price range and further based on the network-based performance capacity of the service providers in fulfilling the allocated service requests during the second dynamic network service fulfillment cycle.

10. The logic of claim 8, wherein the allocating includes:

sorting the service providers according to the respective proposed costs; and allocating the service requests among the sorted service providers, starting with a lowest-cost service provider among the sorted service providers, relative to the network-based performance capacity of the lowest-cost service provider.

11. The logic of claim 10, wherein the allocating among the sorted service providers further includes:

moving allocation of unfulfilled service requests from a currently-allocated service provider to a next service provider among the sorted service providers, based on the currently-allocated service provider reaching the corresponding network-based performance capacity with currently-allocated service requests; and repeating moving allocation to the next service provider among the sorted service providers until the first dynamic network service fulfillment cycle is complete.

12. The logic of claim 10, wherein the calculating of a second seed price includes:

determining a summation of a price influence by each service provider, the price influence by each service provider based on a product of the proposed cost by each service provider multiplied by a count of the service requests allocated to the corresponding service provider; and dividing the summation of the price influence by the first seed price to determine the second seed price.

13. The logic of claim 8, wherein the first network service fulfillment cycle is based on a prescribed number of the service requests being allocated among the service providers.

14. The logic of claim 8, wherein the first network service fulfillment cycle is based on a prescribed number of the service requests being allocated among the service providers within a prescribed time interval.

15. An apparatus comprising:
a network interface circuit configured for advertising a first seed price range for a network service item offered by a plurality of service providers in a computing network, the network interface circuit configured for receiving respective proposed costs advertised by the service providers; and
a processor circuit configured for setting a first seed price for the network service item and generating the advertisement for the first seed price range relative to the first seed price, the processor circuit further configured for allocating service requests for the network service item among the service providers within a first dynamic network service fulfillment cycle, the processor circuit allocating the service requests based on respective proposed costs advertised by the service providers relative to the first seed price range and further based on network-based performance capacity of the service providers in fulfilling the allocated service requests, the processor circuit further configured for calculating a second seed price for a second dynamic network service fulfillment cycle contiguously following the first dynamic network service fulfillment cycle, based on the first seed price and the allocating within the first dynamic network service fulfillment cycle.

16. The apparatus of claim 15, wherein the processor circuit is further configured for:
generating an advertisement for a second seed price range for the network service item based on the second seed price; and
allocating a subsequent group of the service requests for the network service among the service providers within the second dynamic network service fulfillment cycle, based on second respective proposed costs advertised by the service providers relative to the second seed price range and further based on the network-based performance capacity of the service providers in fulfilling the allocated service requests during the second dynamic network service fulfillment cycle.

17. The apparatus of claim 15, wherein the processor circuit is configured for allocating the service requests based on:
sorting the service providers according to the respective proposed costs; and
allocating the service requests among the sorted service providers, starting with a lowest-cost service provider among the sorted service providers, relative to the network-based performance capacity of the lowest-cost service provider.

18. The apparatus of claim 17, wherein the processor circuit is configured for allocating the service requests based on:
moving allocation of unfulfilled service requests from a currently-allocated service provider to a next service provider among the sorted service providers, based on the currently-allocated service provider reaching the corresponding network-based performance capacity with currently-allocated service requests; and
repeating moving allocation to the next service provider among the sorted service providers until the first dynamic network service fulfillment cycle is complete.

19. The apparatus of claim 17, wherein the processor circuit is configured for calculating the second seed price based on:
determining a summation of a price influence by each service provider, the price influence by each service provider based on a product of the proposed cost by each service provider multiplied by a count of the service requests allocated to the corresponding service provider; and
dividing the summation of the price influence by the first seed price to determine the second seed price.

20. The apparatus of claim 15, wherein the first network service fulfillment cycle is based on a prescribed number of the service requests being allocated among the service providers within a prescribed time interval.

* * * * *